US011568380B2

(12) United States Patent
Good et al.

(10) Patent No.: US 11,568,380 B2
(45) Date of Patent: Jan. 31, 2023

(54) SYSTEMS AND METHODS FOR USE IN PROVIDING PAYMENT TRANSACTION NOTIFICATIONS

(71) Applicant: MASTERCARD INTERNATIONAL INCORPORATED, Purchase, NY (US)

(72) Inventors: William J. Good, Dardenne Prairie, MO (US); Joshua Fields, Chesterfield, MO (US); Mark R. Smelcer, Wentzville, MO (US); Amit Patankar, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1229 days.

(21) Appl. No.: 15/075,612

(22) Filed: Mar. 21, 2016

(65) Prior Publication Data
US 2017/0270521 A1    Sep. 21, 2017

(51) Int. Cl.
*G06Q 20/22* (2012.01)
*G06Q 20/40* (2012.01)
(Continued)

(52) U.S. Cl.
CPC ..... *G06Q 20/2295* (2020.05); *G06Q 20/3672* (2013.01); *G06Q 20/401* (2013.01); *H04L 51/046* (2013.01); *H04L 51/56* (2022.05)

(58) Field of Classification Search
None
See application file for complete search history.

(56) References Cited

U.S. PATENT DOCUMENTS

| 6,796,496 B2 * | 9/2004 | Andersen | G07F 7/1008 |
|  |  |  | 235/380 |
| 7,909,246 B2 * | 3/2011 | Hogg | G06Q 20/20 |
|  |  |  | 235/382 |

(Continued)

FOREIGN PATENT DOCUMENTS

| CN | 102870132 A | 1/2013 |
| CN | 105493115 A | 4/2016 |

OTHER PUBLICATIONS

An IP.com Prior Art Database Technical Disclosure (Sharing of Limited Use Credit Authorization Codes on Mobile Devices) (Year: 2016).*

*Primary Examiner* — Mamon Obeid
(74) *Attorney, Agent, or Firm* — Harness, Dickey & Pierce, P.L.C.

(57) ABSTRACT

Systems and methods are provided for use in distributing payment transaction notifications. One exemplary method includes identifying, by a computing device, transaction data for a transaction associated with a child token to a group payment account and identifying, by the computing device, in a data structure, a parent token with which the child token is associated. The parent token is enrolled to receive a notification for the transaction associated with the child token. As such, the method further includes transmitting, by the computing device, a notification to a communication device of a group member associated with the parent token in response to the transaction involving the child token, where the notification includes transaction data associated with the transaction such that the transaction is thereby identified to the group member along with the associated transaction data.

7 Claims, 5 Drawing Sheets

(51) Int. Cl.
*G06Q 20/36* (2012.01)
*H04L 51/046* (2022.01)
*H04L 51/56* (2022.01)

(56) References Cited

U.S. PATENT DOCUMENTS

| | | | | |
|---|---|---|---|---|
| 8,127,982 B1* | 3/2012 | Casey | G06Q 40/02 | 235/382.5 |
| 8,577,053 B1* | 11/2013 | Simon | H04R 27/00 | 381/98 |
| 8,682,802 B1* | 3/2014 | Kannanari | G06Q 20/3274 | 705/64 |
| 9,603,094 B2* | 3/2017 | Wood | H04M 1/72406 | |
| 9,820,088 B2* | 11/2017 | Keskitalo | H04W 4/029 | |
| 2003/0046690 A1* | 3/2003 | Miller | H04N 7/088 | 348/E7.083 |
| 2003/0069802 A1* | 4/2003 | Ramsey-Catan | G06Q 30/0609 | 705/26.81 |
| 2003/0163787 A1* | 8/2003 | Hay | G06Q 30/06 | 715/248 |
| 2005/0144048 A1* | 6/2005 | Belanger | G06Q 30/0645 | 705/5 |
| 2007/0168429 A1* | 7/2007 | Apfel | H04L 67/563 | 709/206 |
| 2009/0281937 A1* | 11/2009 | Gupta | G06Q 20/405 | 705/35 |
| 2011/0047265 A1* | 2/2011 | Withers | G06F 21/316 | 709/224 |
| 2011/0173681 A1* | 7/2011 | Qureshi | H04L 63/0823 | 726/4 |
| 2012/0197793 A1* | 8/2012 | Grigg | G06Q 20/40 | 705/41 |
| 2013/0018792 A1* | 1/2013 | Casey | G06Q 40/02 | 705/44 |
| 2014/0006283 A1* | 1/2014 | Hogg | G06Q 20/384 | 705/44 |
| 2014/0006297 A1* | 1/2014 | Hogg | G06Q 50/01 | 705/319 |
| 2014/0007213 A1* | 1/2014 | Sanin | H04L 63/0807 | 726/9 |
| 2014/0038546 A1* | 2/2014 | Neal | G06Q 20/3224 | 455/405 |
| 2014/0075515 A1* | 3/2014 | McColgan | H04W 12/069 | 726/4 |
| 2014/0164557 A1* | 6/2014 | Keskitalo | H04W 4/02 | 709/217 |
| 2014/0354448 A1* | 12/2014 | Armitage | H04Q 9/00 | 340/870.16 |
| 2015/0215309 A1* | 7/2015 | Aigner | H04L 63/0884 | 726/4 |
| 2015/0350807 A1* | 12/2015 | Andrews | H04W 76/14 | 455/414.2 |
| 2016/0300224 A1* | 10/2016 | Liu | G06K 19/06112 | |
| 2017/0061406 A1* | 3/2017 | Adams | G06Q 20/2295 | |
| 2017/0262841 A1* | 9/2017 | Good | H04L 63/0876 | |
| 2017/0270521 A1* | 9/2017 | Good | H04L 51/046 | |
| 2017/0270557 A1* | 9/2017 | Maenpaa | G06Q 20/363 | |
| 2017/0279774 A1* | 9/2017 | Booz | G06Q 20/0658 | |
| 2018/0060838 A1* | 3/2018 | Agrawal | G06Q 20/102 | |
| 2018/0069813 A1* | 3/2018 | Tevonian | H04L 67/1061 | |
| 2018/0322259 A1* | 11/2018 | Solow | G06F 21/645 | |
| 2019/0172366 A1* | 6/2019 | Birt | G06Q 20/36 | |
| 2020/0111081 A1* | 4/2020 | Kallugudde | G06Q 20/3672 | |

* cited by examiner

SYSTEMS AND METHODS FOR USE IN PROVIDING PAYMENT TRANSACTION NOTIFICATIONS

CROSS-REFERENCE TO CO-OWNED APPLICATION

The present disclosure includes subject matter that may relate to subject matter included in co-owned U.S. patent application Ser. No. 15/065,074, filed on Mar. 9, 2016, and titled "METHOD AND SYSTEM FOR ELECTRONIC DISTRIBUTION OF CONTROLLED TOKENS." The entire disclosure of the above application is incorporated herein by reference.

FIELD

The present disclosure generally relates to systems and methods for use in providing payment transaction notifications and, in particular, for providing one or more notifications regarding child tokens, which may be transaction notifications and/or report notifications, etc.

BACKGROUND

This section provides background information related to the present disclosure which is not necessarily prior art.

Payment accounts are known to be used by consumers to fund transactions for products (e.g., goods and services, etc.) from the same or different merchants. In addition, the payment accounts may be used by groups of consumers, such as families, businesses, companies, organizations, etc., to initiate and fund the transactions.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Certain groups of consumers (e.g., families, companies, associations, businesses, organizations, etc.) use group payment accounts for purchases by members of the groups (broadly, consumers). The members may include, for example, family members (e.g., fathers, mothers, spouses, daughters, sons, etc.), members of an association, employees of a business, etc. For example, as described herein, each member of a group may be issued a token associated with a payment account for the group, and with which purchase transactions to the payment account can be initiated. Some members are issued main tokens, or parent tokens (e.g., heads of the family (e.g., parents, etc.), managers, directors, officers, etc.), while other members are issued subordinate tokens, or child tokens (e.g., children, employees, clerks, etc.). Typically, the parent tokens permit the members to access and/or control the group payment account, while the child tokens merely enable the members to make purchases using the payment account.

Uniquely, the systems and methods herein permit members of groups, associated with parent tokens for group payment accounts, to enroll, with a notification engine, to receive notifications related to transactions to the group payment accounts and to further receive the notifications from the notification engine. The notifications may be provided as transaction notifications and/or report notifications. As such, the members associated with the parent tokens (i.e., the parent members) may be notified about when, where, and/or how other members of the groups, associated with child tokens for the group payment accounts, are using the payment accounts, including, for example, identifying what transactions are being performed, what products are being purchased, etc. In this manner, the parent members are able to review and/or audit transaction behaviors of the other members, and then take action, if necessary.

Figure 1:
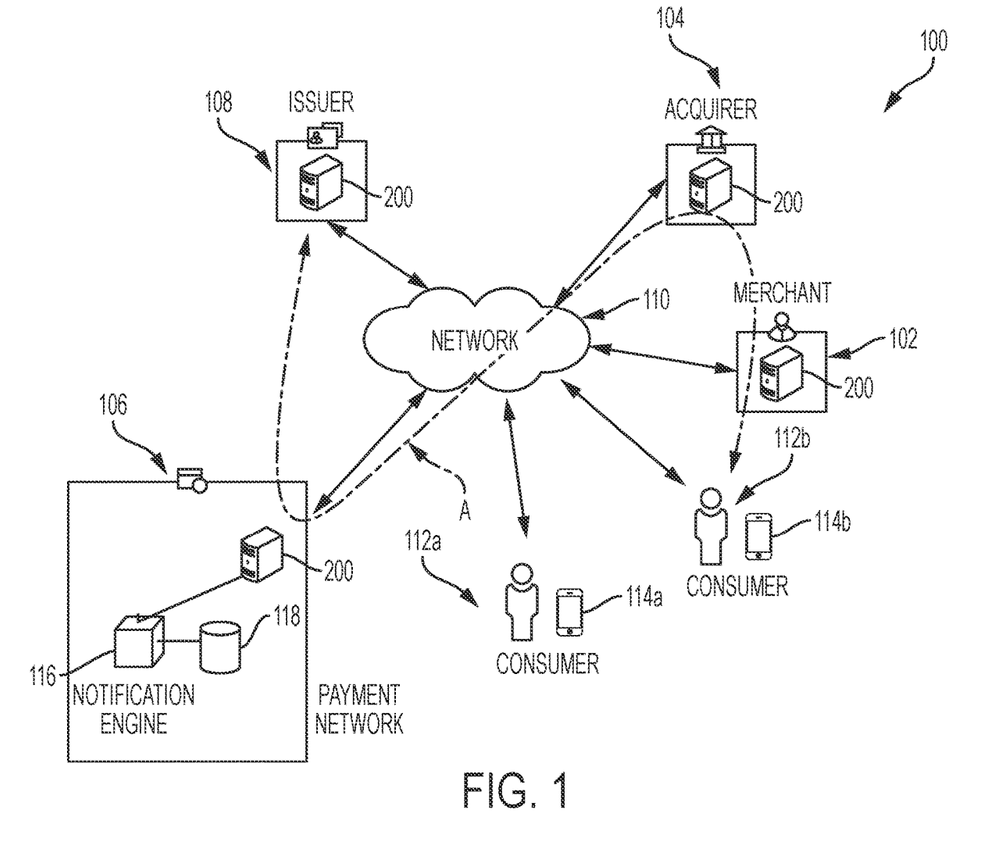
FIG. 1 is a block diagram of an exemplary system of the present disclosure suitable for use in providing notifications related to token transactions for group payment accounts.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, processing of purchase transactions to tokens associated with group payment accounts, delivery of notifications to members associated with the tokens, etc.

The system 100 generally includes a merchant 102, an acquirer 104, a payment network 106, and an issuer 108, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between one or more of the merchant 102, the payment network 106, the issuer 108, and consumers 112a-b (including their associated communication devices 114a-b), etc.

Generally in the system 100, the merchant 102 is associated with products (e.g., goods, services, etc.), which are offered for sale and are sold to consumers, including, for example, consumers 112a-b. The merchant 102 may offer the products for sale in physical locations or through websites, or through other internet-based store fronts, as desired. It should be appreciated that, while only one merchant 102 and two consumers 112a-b are illustrated in FIG. 1, for ease of reference, multiple merchants and/or consumers may be added in the system 100, whereby there may be many different consumers purchasing products at a variety of different merchants.

Also in the system 100, the consumers 112a-b are able to fund transactions with the merchant 102 for one or more of the products, via a group payment account. Each of the consumers 112a-b is a member of a group (e.g., a family, association, business, company, organization, etc.), such that each of the consumers 112a-b is permitted to make purchases to the group payment account (as such, the consumers 112a-b are also referred to as members or group members herein). Purchases to the payment account, by the consumer 112a and/or the consumer 112b, are often associated with presenting payment account information for the payment account, such as, for example, a primary account number (PAN), a token A, or a token B, as described more below, or other indications associated with the payment account. The indication of the payment account is often presented via a payment device to a point of sale (POS) terminal associated with the merchant 102, such as by swiping or presenting a card or fob into, through or proximate to a reader, or by presenting an electronic wallet (or e-wallet) device, etc.

The consumers 112a-b are associated with the communication devices 114a-b, respectively. In this exemplary embodiment, the communication devices 114a-b are portable communication devices, such as, for example, smartphones, tablets, laptops, etc. Each of the communication devices 114a-b may include, or may be associated with, an internet-based payment application (e.g., as a stand-alone application, or as a part of an application, on a mobile operating system or the like (e.g., an e-wallet payment application, etc.) etc.), which may include a unique application ID, or device ID. Specifically, in this exemplary embodiment, the communication devices 114a-b each include an e-wallet payment application, which is associated with a token issued to a respective one of the consumers 112a-b. The e-wallet payment application employs the tokens as account identifiers in initiating transactions (e.g., for providing account credentials, etc.). The communication devices 114a-b may each further be configured, by the e-wallet payment application or another application, to interact with a notification engine 116 at the payment network to receive information about transactions performed by the consumers 112a-b at merchants (e.g., the merchant 102, etc.), using the group payment account, and the like. This will be described in more detail hereinafter.

In a specific transaction example, the consumer 112b may initiate a transaction with the merchant 102, for the purchase of a product, by presenting a payment device associated with the group payment account to the merchant 102 (e.g., the communication device 114b, with an active e-wallet payment account, etc.). In turn, the merchant 102 submits an authorization request to the acquirer 104 (associated with the merchant 102) for the transaction, to determine whether the payment account is in good standing and whether there is sufficient funds and/or credit to fund the transaction. The authorization request is transmitted along path A in the system 100, as referenced in FIG. 1. The acquirer 104 communicates the authorization request with the issuer 108 (associated with the consumer's payment account), through the payment network 106, such as, for example, through MasterCard®, VISA®, Discover®, American Express®, etc. In turn, if approved, an authorization reply, or response (indicating the approval of the transaction), is transmitted back from the issuer 108 to the merchant 102, along path A, thereby permitting the merchant 102 to complete the transaction. The transaction is later cleared and/or settled (via appropriate transaction messages such as clearing messages and/or settlement messages along path A, for example) by and between the merchant 102, the acquirer 104, and the issuer 108 (by appropriate agreements). If the transaction is declined, however, an authorization reply (indicating a decline of the transaction) is provided back to the merchant 102, along path A, thereby permitting the merchant 102 to halt or terminate the transaction, or request alternate funding.

Transaction data is generated, collected, and stored as part of the above interactions among the merchant 102, the acquirer 104, the payment network 106, the issuer 108, and the consumer 112b (and included in the various transaction messages). The transaction data represents at least a plurality of transactions, for example, authorized transactions, cleared and/or settled transactions, attempted transactions, etc. The transaction data, in this exemplary embodiment, is stored at least by the payment network 106 (e.g., in a data structure associated with the payment network 106, etc.). Additionally, or alternatively, the issuer 108 (or other entities, shown in system 100 or not) may store the transaction data, or part thereof, in a data structure, or transaction data may be transmitted between parts of system 100 as used or needed.

Transaction data, as used herein, may include, for example (and without limitation), primary account numbers (PANs) for payment accounts involved in the transactions, tokens associated with the payment accounts, amounts of the transactions, merchant IDs, merchant category codes (MCCs), dates/times of the transactions, payment device identifiers (e.g., application IDs, device IDs, etc.), payment/notification application IDs, location IDs, products purchased and related descriptions or identifiers, etc. It should be appreciated that more or less information related to transactions, as part of either authorization, clearing and/or settling, may be included in transaction data and stored within the system 100, at the merchant 102, the acquirer 104, the payment network 106 and/or the issuer 108.

While one acquirer 104, one payment network 106, and one issuer 108 are illustrated in FIG. 1, it should be appreciated that any number of these entities (and their associated components) may be included in the system 100, or may be included as a part of systems in other embodiments, consistent with the present disclosure.

Figure 2:
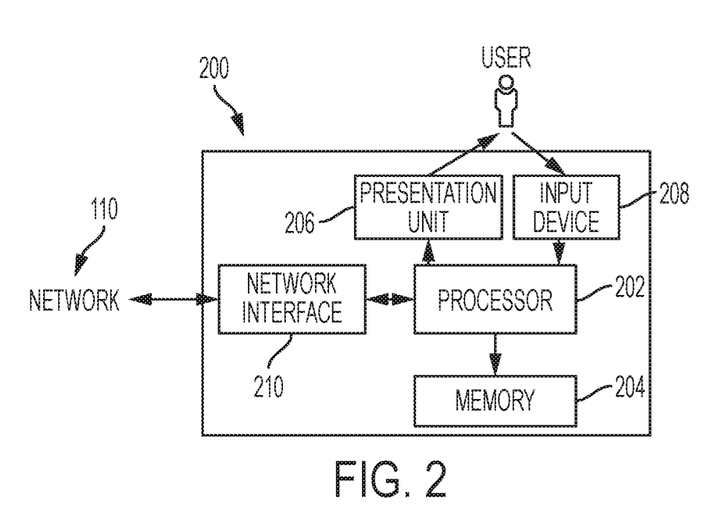
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, point-of-sale devices, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices.

In the exemplary embodiment of FIG. 1, each of the merchant 102, the acquirer 104, the payment network 106, and the issuer 108 are illustrated as including, or being implemented in, computing device 200, coupled to (and in communication with) the network 110. In addition, the notification engine 116 in the system may be considered a computing device consistent with computing device 200. Further, the communication devices 114a-b, which are associated with the consumers 112a-b, respectively, can also be considered computing devices consistent with computing device 200 for purposes of the description herein.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, tokens, notification rules, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein.

In the exemplary embodiment, the computing device 200 also includes a presentation unit 206 that is coupled to (and in communication with) the processor 202 (however, it should be appreciated that the computing device 200 could include output devices other than the presentation unit 206, etc.). The presentation unit 206 outputs information (e.g., notifications, etc.), visually, for example, to a user of the computing device (e.g., the consumer 112a at the communication device 114a, etc.). It should be further appreciated that various interfaces (e.g., as defined by operating system-based applications (e.g., conventional operating systems, mobile operating systems, etc.), web-based applications, websites, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

In addition, the computing device 200 includes an input device 208 that receives inputs from a user (e.g., from the consumers 112a-b, etc.) (i.e., member inputs) such as, for example, transaction notification enrollment inputs, etc. The input device 208 may include a single input device or multiple input devices. Moreover, the input device 208 is coupled to (and in communication with) the processor 202 and may include, for example, one or more of a keyboard, a pointing device, a mouse, a stylus, a scanner, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 110. In some exemplary embodiments, the computing device 200 includes the processor 202 and one or more network interfaces incorporated into or with the processor 202.

Referring again to FIG. 1, the notification engine 116 is specifically configured to perform one or more of the operations described herein. The notification engine 116 is illustrated in conjunction with a token data structure 118, and is configured to communicate therewith. In the system 100, the notification engine 116 and token data structure 118 are incorporated with the payment network 106. It should be appreciated, however, that the notification engine 116 and/or the token data structure 118 (together or separately) may be associated with, or incorporated in, other parts of the system 100 (e.g., the issuer 108, etc.) or other parts in general (not shown in FIG. 1), in other embodiments. Regardless of association, the notification engine 116 is generally permitted and able to access the token data structure 118 in order to perform the operations described herein.

In addition, the token data structure 118 is configured according to known data storage schemes (e.g., a relational database, etc.), including, specifically, storage of token related data and/or notification related data in association with group payment accounts.

In general in the system 100, each group payment account is identified to multiple tokens, which may be of the same or different types. For example, a main token, or parent token, may be associated with the payment account as well as one or multiple subordinate tokens, or child tokens. The child tokens may grant a consumer the ability to make purchases with the payment account, but may not permit the consumer to access various features of the payment account such as accessing transaction histories, issuing child tokens, altering contact information, etc. Conversely, the parent token may grant the consumer associated therewith full access to the payment account and available related information and/or features (e.g., creating additional child tokens, etc.). The type of tokens and/or their relation to other tokens is stored in the token data structure 118. In one example, a company may permit its employees to fund business purchases through only one payment account. A manager of the company may retain the parent token to the payment account and distribute child tokens to employees, in the form of credit cards. Each credit card may have different numbers/credentials, but all of the cards enable purchases using the same company payment account. Alternatively, or additionally, the child tokens may be issued to the employees electronically for use with mobile devices or the like. As another example, parent(s) (or heads of a family) may maintain a family payment account, and provide a child token to one or more children of the family, for use, for example, in emergencies or for other purposes. The child token enables the children to fund transactions through the family payment account. In either example, the authority member(s) associated with the payment account (e.g., the manager, the parents, etc.) may provide limits on the use of the company/family payment account, by rules directed to the employees/children, or through features associated with the payment account and/or child tokens.

With regard to the group payment account associated with the consumers 112a-b in the system 100, the consumer 112a is issued a parent token for the group payment account (i.e., token A), which is linked and/or stored on consumer's communication device 114a (e.g., in the e-wallet payment application, etc.), and the consumer 112b is issued a child token for the group payment account (i.e., token B), which is linked and/or stored on the consumer's communication device 114b. It should be appreciated that different parent/child schemes, including, for example, a scheme where a parent token is associated with multiple child tokens, a scheme where more than one level of parent/child relationships exists, a scheme where more than two different types of tokens are issued (i.e., each type providing different features associated with a payment account, etc.), and/or other schemes in which different types of tokens and/or numbers or levels of tokens are associated with one group payment account, etc. In one scheme, it is contemplated that the parent and child tokens may be associated with different payment accounts, but that the child tokens are still related to the parent token for notification purposes as described herein.

The token data structure 118 includes, without limitation, token-related data for each token for the group payment account associated with the consumers 112a-b (as well as token-related data for tokens for other group payment accounts), such as a token identifier for each token A-B, a unique device ID for each of the communication devices 114a-b, an app ID, and names and contact information (e.g., address, phone number, email address, contact preferences, etc.) of the consumers 112a-b, an indication of the consumers' group associated with the group payment account, a name of the consumers' group, a group ID for the group, etc. The token data structure 118 also includes relationships between the different tokens A-B (e.g., parent-child, etc.). For instance, the token data structure 118 may include a data table, in which the child token B is unique and/or is associated with a unique device ID, and/or application ID, and is also associated with the parent token A (and, potentially, is also associated with a payment account). As can be appreciated, in general in the token data structure 118, multiple child tokens may be associated with a parent token and, potentially, multiple parent tokens may be associated with a child token.

In addition in the system 100, the token data structure 118 includes notification rules, which direct/instruct the notification engine 116 when and/or how to transmit, or cause to be transmitted, a notification to one or both of the consumers 112a-b associated with the group payment account and/or the tokens A-B, etc. The notification rules may include predefined rules, for example, from the issuer 108 providing the group payment account. Or, the notification rules may be generated by one or more of the consumers 112a-b, for example, via notification applications on their communication devices 114a-b.

As an example, a notification rule may indicate that a notification is to be transmitted to consumer 112a (associated with the parent token A), by the notification engine 116, when a transaction to the group payment account (regardless of which token A-B is used) is over a certain transaction amount threshold (e.g., $35, $100, etc.), is within, or not, a defined geographic region (e.g., is within, or not, a particular postal code, area code, state, or other geographic delineation, etc.), is within, or not, one or more particular categories (e.g., identified by merchant category code (MCC), etc.), is at a particular time of day (e.g., is within a predefined time period, etc.), or is on a particular day of the week, etc. Alternatively in this example, a notification rule may indicate that a notification is to be transmitted to consumer 112a (associated with the parent token A) when a transaction involving token B is over a certain transaction amount threshold (e.g., $35, $100, etc.), is within, or not, a defined geographic region (e.g., is within, or not, a particular postal code, area code, state, or other geographic delineation, etc.), is within, or not, one or more particular categories (e.g., identified by merchant category code (MCC), etc.), is at a particular time of day (e.g., is within a predefined time period, etc.), or is on a particular day of the week, etc. Further notification rules may be based on aggregate transactions, such as, for example, a notification when a daily spend exceeds a threshold, or when a transaction frequency is more than 4, 5, 10, or 15, etc. transactions per day, week, etc. Still other notification rules may be unconditioned, e.g., transmit a notification for every transaction (e.g., every transaction made to the group account, every transaction made using the child token B, etc.). It should be appreciated that various other notification rules may be provided in the token data structure 118 to cause a notification to be transmitted to the consumer 112a and/or the consumer 112b. In addition, it should be appreciated that such notification rules can be defined such that the notifications are caused to be transmitted to any desired party, for example, consumer 112a in the above examples (as associated with the parent token A), consumer 112b (as associated with the child token B), both consumers 112a-b, etc.

The notification rules may also define customized preferences. For example, the consumers 112a-b may select preferred methods of delivery (e.g., SMS, phone call, email, web application, mobile phone application, voicemail, etc.) and may provide preferred contact information (e.g., email address: person@company.com, phone number: 555-555-5555, etc.). The customized preferences may further indicate particular types of notifications to be received, desired content of the notifications, etc., such as, for example, a transaction notification (one per transaction) and/or a report notification (one per multiple transactions and/or at an interval, etc.), etc. As an example, the consumer 112a may select to receive a short notification including a token identifier (e.g., a token, a pseudonym, a nickname, or a name of the particular one of the consumers 112a-b associated with the token used in the particular transaction causing the notification, etc.), an amount of the transaction, and a merchant at which the transaction took place. While the consumer 112b may not receive notifications, or may receive different notifications or notifications having different content. Moreover, in connection with another group account, a different member (associated with a parent token) may select to receive a longer notification including more exhaustive information about the transaction, or multiple transactions, such as the specific date and time of the transaction, a category of the transaction, etc.

In general, the content of the notifications, as defined by the notification rules, may be different between different notifications and/or for different members of different groups (or for different members of the same group). As such, a transaction notification may include transaction data such as merchant ID, time, and amount, while a report notification may include the same information (e.g., the same transaction data, etc.) across multiple transactions and then also include related totals for the multiple transactions, etc. More generally, the content of the notifications may include token identifiers, application IDs, device IDs, transaction amounts, totals, summaries, transaction times/dates, transaction locations, merchant IDs, parties involved in the transactions, transaction categories/types, other transaction data, etc. Thus, the notification rules stored in the token data structure 118 may be different per group member, per token, per payment account, and/or otherwise (or they may be the same for the different members, tokens, payment accounts, etc.), whereby the members/consumers are able to customize the notifications they receive from the notification engine 116.

In the system 100, the notification rules are set by the consumers 112a-b. Specifically, during an initial enrollment or during a modifying enrollment, to the notification engine 116, the consumers 112a-b may provide one or more notification rules to the notification engine 116. In several embodiments, enrollment is accomplished via a computer notification application installed and/or active in a computing device associated with the person, such as, for example, the communication device 114a associated with consumer 112a (and/or the communication device 114b associated with consumer 112b). The application may interact with the notification engine 116, as part of a service associated with the payment network 106 (e.g., MasterCard Digital Enablement Express (MDES) service by MasterCard®, etc.). The notification application may provide functionality that permits the consumer 112a (or the consumer 112b as appropriate) to, for example, enroll to receive notifications, change notification rules, request report notifications (or other specific notifications), and/or take action in response to a notification. In the system 100, the e-wallet payment application and the notification application are integrated in the communication devices 114a-b, and associated with token A and token B, respectively. In other embodiment, the notification application may be separate from one or more payment applications.

In connection with such enrollment, the notification engine 116 is configured to provide notifications (e.g., transaction notifications and/or report notifications, etc.) to the consumers 112a-b associated with the tokens A-B, and/or permit the consumers 112a-b (and other members) to receive such notifications, etc., as defined in the notification rules. Thus, as can be appreciated, notification rules can be generated to provide any desired notifications to any desired members of group accounts (and/or any desired members associated with parent and/or child tokens), whether to members creating the notification rules or to others (and/or whether to members of the associated group payment accounts and/or tokens, or not).

In particular in the system 100, the notification engine 116 is configured to access transaction data and/or to identify transaction data (and/or transactions) to the group payment account and/or involving one or more of the associated tokens A-B. The notification engine 116 may be configured to, upon identification of a transaction involving one of the tokens A-B (or a PAN associated with the group payment account), determine if the token is related to one or more other tokens (e.g., determine if the token is a child token related to a parent token, determine if the token is a parent token with related child tokens, etc.), determine if the token (and/or the related token) is enrolled to receive notification, and if so, cause a notification to be transmitted to one or more of the consumers 112a-b associated with the token and/or related token (and/or with the related group payment account) consistent with one or more applicable notification rules in the token data structure 118.

In another particular aspect, the notification engine 116 is configured to receive a request for a report notification and to cause (e.g., generate and/or transmit, etc.) a report notification related to one or more tokens (e.g., tokens A-B in the system 100, etc.) and/or related to a group payment account, to be transmitted to a member requesting the report notification (e.g., to one or more of the consumers 112a-b, etc.). Like above, the notification engine 116 may be configured to compile the report notification consistent with one or more notification rules, and/or the request, in causing the report notification to be transmitted.

It should be appreciated that, while the system 100 is described with reference to consumers 112a-b, their tokens A-B, and their group payment account, the system 100 is configured to accommodate multiple different group payment accounts each having multiple members (and potentially multiple tokens). And, in connection therewith, the notification engine 116 is configured to perform as described herein relative to each of the group payment accounts and each of their corresponding members.

Figure 3:
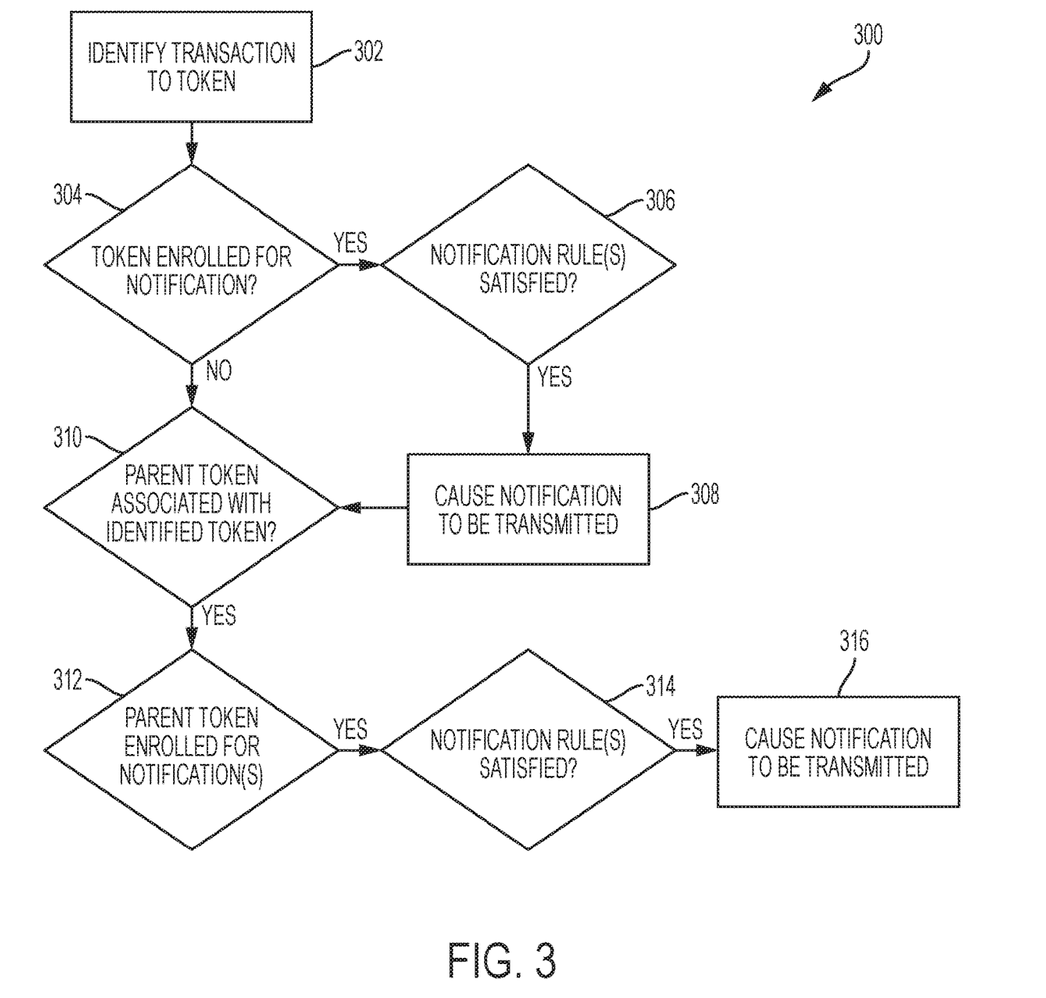
FIG. 3 is an exemplary method, which may be implemented in connection with the system of FIG. 1, for providing notifications to a member associated with a parent token for a transaction initiated by a child token associated with the patent token.

FIG. 3 illustrates an exemplary method 300 for distributing notifications to members associated with group payment accounts and related payment account tokens. The exemplary method 300 is described as implemented in the notification engine 116, in connection with interactions between the payment network 106, the consumers 112a-b, and the token data structure 118 of the system 100, and also with reference to computing device 200. The methods herein should not be understood, however, to be limited to the exemplary system 100 or the exemplary computing device 200, and likewise, the systems and the computing devices herein should not be understood to be limited to the exemplary method 300.

As described above for the system 100, the consumers 112a-b are both associated with the group payment account. In connection therewith, token A of the group payment account is associated with the consumer 112a as a parent token. Similarly, token B of the group payment account is associated with the consumer 112b as a child token. Each of the tokens A and B is linked to the same payment account in the method 300 (however, this is not required in all embodiments). Upon issuance of the tokens A-B, consumer 112a enrolls with the notification engine 116 (as described more below), to receive a notification for each transaction involving the child token B, and further to receive a notification when a transaction in excess of $100 is associated with token A, etc. (via notification rules stored in the token data structure 118).

Once consumer 112a is enrolled, the notification engine 116 monitors transaction data, in order to identify transactions to the group payment account (and/or to identify transactions initiated using the tokens A-B). In particular, as shown in FIG. 1, the notification engine 116 is part of the payment network 106, but it is not included in the processing of transactions. As transaction data is generated in the processing of transactions, the notification engine 116 monitors the transaction traffic within the payment network 106.

When a transaction for $112.00 to merchant 102 is initiated, for example, based on token A, the notification engine 116 identifies, at 302, the transaction as associated with token A. The notification engine 116 then determines, at 304, if token A is enrolled for notifications. In this example, token A is enrolled for (or is associated with) notifications (through consumer 112*a*), subject to one notification rule, i.e., a notification to consumer 112*a* for transactions over $100. As such, the notification engine 116 determines, at 306, if the transaction satisfies the notification rule(s) for token A (stored in the data structure 118), i.e., is in excess of $100, and because $112 is more than $100, the notification rule is satisfied. In turn, the notification engine 116 compiles a notification (as defined by the applicable notification rule) and causes, at 308, the notification to be sent to the consumer 112*a*. The notification may include, for example, a SMS message, an email message, a voicemail message, a web-based application message (e.g., via the e-wallet payment application at the communication device 114*a*, etc.), or any other suitable message transmitted, in this example, to the communication device 114*a* (for review by the consumer 112*a* via presentation unit 206), etc.

In contrast, at 306 in the method 300, if the amount of the transaction to merchant 102, based on token A, had been below the $100 threshold associated with the notification rule, the notification engine 116 would instead not transmit the notification to the consumer 112*a*.

It should be appreciated that various different and/or additional notification rules may be included in the token data structure 118, upon or in connection with enrollment of the consumer 112*a* to the notification engine 116, that define any number of bases for a notification to be triggered and transmitted to the consumer 112*a*, at 308. For example, a notification may be triggered by a merchant involved in a transaction with the consumer 112*a* using token A (or the consumer 112*b* using token B) being within a particular category (e.g., as defined by a MCC, etc.), or satisfying merchant category criteria, product category criteria, etc. In another example, a notification may be triggered by a merchant involved in a transition with the consumer 112*a* using token A (or the consumer 112*b* using token B) being inside, or outside a particular geographic region (e.g., as defined by postal code, etc., or satisfying location criteria, etc.).

In addition, apart from merely triggering notifications, it should be appreciated that notification rules in the token data structure 118 may further define the particular notifications to be transmitted when the rules are triggered. For example, the notification rules may indicate the content of the notifications, based on the conditions for which the notifications are to be sent. In the method 300, in connection with enrollment to the notification engine 116, the consumer 112*a* may elect to receive the purchase time/date, transaction amount, location, associated MCC, and merchant ID (e.g., a first set of transaction data, etc.) in connection with any notifications relating to token B, but only the transaction amount and time/date (e.g., a second set of transaction data, etc.) in connection with any notifications relating to token A. Further, the consumer 112*a* may elect to receive notifications via SMS message for purchases relating to token B, and to not receive notifications via the notification application for purchases relating to token A. It should be appreciated that the same content and/or method of delivery may be included in one or more notification rules in other embodiments, which may be the same or different for different tokens and/or payment accounts.

With continued reference to FIG. 3, when the notification engine 116 determines, at 304, that token A is not enrolled for notifications (or after causing a notification to be transmitted at 308), the notification engine 116 determines, at 310, whether a parent token is associated with token A. Since token A is already a parent token, the notification engine determines there is no associated parent token and, as such, at 310, determines no parent token exists and does not provide further notifications.

Further in the method 300, when a transaction to token B is initiated by the consumer 112*b*, at merchant 102, for example, the notification engine 116 identifies the transaction, at 302. In turn, the notification engine 116 determines whether token B is enrolled to receive (or is associated with) notifications, at 304. Here, token B is not enrolled to receive notifications, so the notification engine 116 proceeds to determine, at 310, if a parent token is associated with token B. Token A is the parent token for token B, so the notification engine 116 determines that parent token A is associated with token B (e.g., in the token data structure 118, etc.), at 310, and then determines, at 312, if the consumer 112*a* associated with token A is enrolled to receive notifications for transactions by token B. As indicated above, the consumer 112*a* is enrolled to receive notifications, thus the notification engine 116 proceeds to determine, at 314, if any applicable notification rules are satisfied (e.g., as retrieved from the token data structure 118, etc.). Because the consumer 112*a* is enrolled to receive a notification for each transaction involving the child token B, the notification engine 116 identifies the corresponding rule in the data structure 118 as satisfied and causes, at 316, a notification to be generated and transmitted to the communication device 114*a* associated with the consumer 112*a* (e.g., for review at presentation unit 206, etc.). The notification may be transmitted in near real time (e.g., within micro-sections of the transaction, within a few seconds of the transaction, within a few minutes of the transaction, within a time interval generally accepted in the art for transmitting real-time notifications, etc.), or not.

Like above, notifications for a parent token may generally be subject to one or more notification rules, which indicate the content and/or method of delivery of the notifications. As indicated above, the consumer 112*a* (e.g., parent member) associated with token A is enrolled to receive notifications related to token B, for example, via SMS message, with the notifications including a purchase time/date, an amount, a location, an associated MCC, and a merchant ID for the related transactions. As such, at 316 in the method 300, in connection with causing the notification to be transmitted, the notification engine 116 causes an SMS notification to be transmitted to the consumer 112*a* (to the communication device 114*a*), including the above content. It should be understood that other content and/or a different delivery methods may be defined in other notification rules.

At this point in the method 300, each of the consumers 112*a*-*b* are described as using their tokens A-B, respectively, to initiate purchase transactions. When, instead, the consumers 112*a*-*b* use the PAN associated with the group payment account to initiate a transaction, the notification engine 116, in various embodiments, may identify the transaction and accesses the token data structure 118 to determine if and/or to whom one or more notifications should be transmitted. For example, when a transaction is initiated by the PAN, the notification engine 116, per the notification rules, causes a notification to be sent to both of the consumers 112a-b (i.e., all members of the group). The notification includes a date/time of the transaction and a merchant ID. As above, it should be appreciated that different notifications may be sent to the same or different members of a group. For example, a notification may be sent to only members associated with a parent token, when a PAN is used, with the notification including a time/date, merchant ID, and amount of the underlying transaction.

Figure 4:
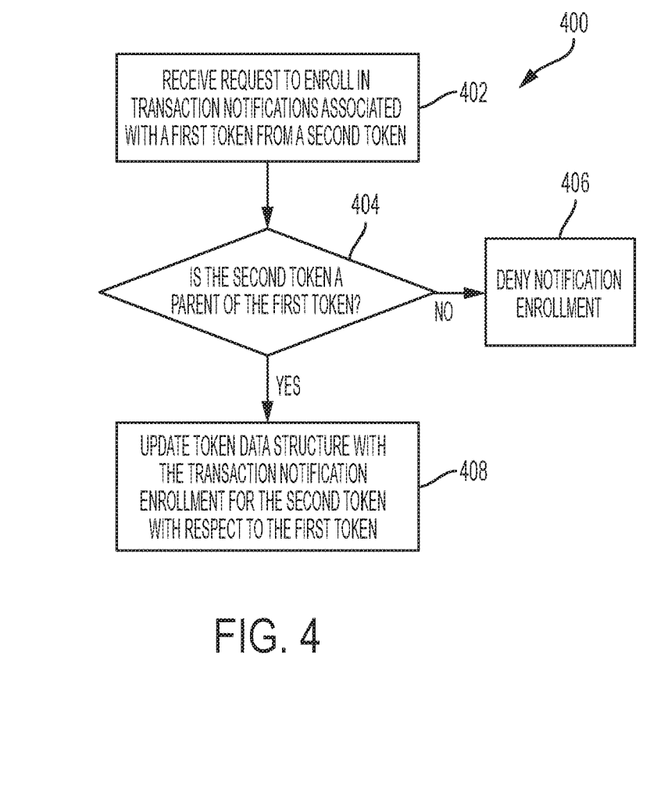
FIG. 4 is an exemplary method, which may be implemented in connection with the system of FIG. 1, for enrolling a member associated with a parent token to receive notifications for transactions initiated with one or more child tokens that are associated with the parent token.

With reference now to FIG. 4, and as described above, the notification rules used by the notification engine 116 define various conditions of and for notifications to be sent to one or more members of a group (e.g., associated with particular tokens, associated with a group payment account, etc.). In addition, the notification rules may be generated (or otherwise selected and/or identified) during enrollment by the members (e.g., by parent and/or child members, etc.) with the notification engine 116.

In particular, FIG. 4 illustrates an exemplary method 400 for enrolling consumer 112a, as associated the parent token A (e.g., of a group payment account, etc.), in notifications associated with transactions involving the child token B (e.g., also of the group payment account, etc.). At 402, the notification engine 116 receives a request from consumer 112a, for example, to enroll in transaction notifications associated with token B (e.g., a first token, etc.) from token A (e.g., a second token, etc.).

At 404 in the method 400, the notification engine 116 accesses the data structure 118 to determine whether, or not, token A (the second token) is a parent of token B (the first token). If not, at 406, the notification enrollment is denied. This may result in a response to the consumer 112a, informing him/her that the enrollment cannot be completed. A reason may be given to the consumer 112a (e.g., "You do not have sufficient privileges to enroll in transaction notifications for this token/account.", etc.). However, if token A is determined to be a parent token to token B, the notification engine 116 updates, at 408, the token data structure 118 to reflect that token A should receive transaction notifications associated with token B in the future. In some embodiments, the consumer 112a associated with token A may also provide one or more notification rule(s) to be recorded in the data structure 118, as described above, to be applied when transactions associated with token B are identified.

Figure 5:
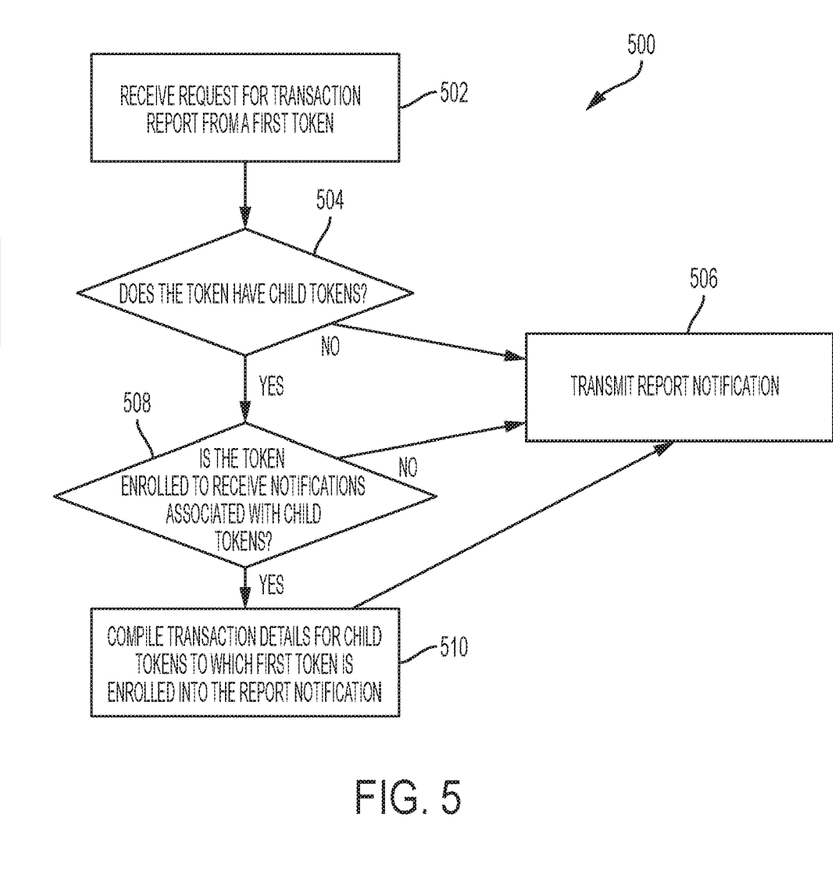
FIG. 5 is an exemplary method, which may be implemented in connection with the system of FIG. 1, for requesting notifications associated with transactions initiated with child tokens, and specifically, report notifications, which include transaction data for transactions associated with one or multiple ones of the child tokens.

With further reference now to FIG. 5, a member of a group associated with a token may request a report notification of transactions associated with one or more other tokens associated with the token (and/or with a group payment account associated with the token and/or the one or more other tokens), such as, for example, all tokens within the group, or specific tokens in the group (e.g., child tokens, etc.). FIG. 5 illustrates an exemplary method 500 for retrieving, by enrolled consumer 112a, as associated with parent token A, a transaction report (as part of the report notification) including transaction details associated with tokens A-B (and potentially other child tokens, etc.).

At 502 in the method 500, the notification engine 116 receives a report notification request for a transaction report from the consumer 112a associated with token A (i.e., a first token or a user of the first token in this example). The request may include, for example, an identifier of tokens A and/or B (or other particular token) and/or consumers 112a and/or 112b (e.g., a token identifier, etc.), a defined transaction interval (e.g., today, last week, last 15 days, last 30 days, etc.), merchant category criteria, location criteria, and/or other suitable criteria regarding transactions to be included in the transaction report, etc. The notification engine 116 then accesses the token data structure 118 and determines, at 504, whether, or not, token A (the first token in this example) has any child tokens associated therewith. The request may also include specific types of data requested (and to be included in transaction reports), such as transaction amounts and/or merchants involved in the transactions. Additionally or alternatively, the request may include limiting rules as to which transactions are returned (e.g., the consumer 112a may request a report on transactions over the past three months, transactions taking place outside of the geographic region, transactions of a defined transaction category, etc.).

If token A (the first token) has no child tokens, the notification engine 116 transmits a report notification, at 506, including the transaction details/data associated with token A (and consistent with the request). However, if token A has child tokens, the notification engine 116 determines, at 508, whether token A is enrolled to receive notifications associated with the identified child tokens (and if any of the child tokens should receive notifications). In some embodiments, enrollment by a parent token to receive notifications associated with a child token indicates that transaction details associated with the child token are also sent with the transaction report. Alternatively, a second notification rule may be selected by a member associated with a parent token, which indicates whether transaction details associated with a corresponding child token are to be transmitted in a report notification. In any case, if sending transaction details associated with the child token is not indicated by the rule of the first token, as above, the report notification is transmitted, at 506.

When token A (the first token) is enrolled to receive notifications associated with child tokens, at 508, the notification engine 116 compiles, at 510, transaction details for each of the child tokens (e.g., token B in the system 100, etc.) to which token A is enrolled and adds the compiled transaction details to the report notification, which is then transmitted, at 506, by the notification engine 116, for example, to consumer 112a. In some embodiments, report notifications include transaction details for transactions associated with parent tokens as well as for identified child tokens. The report notifications further may be transmitted, by the notification engine 116 (or caused thereby), as simple text files or as different types of document files. The report notifications may further group transaction details together according to associated tokens, according to transaction dates, according to merchants, or similar organizations.

Figure 6:
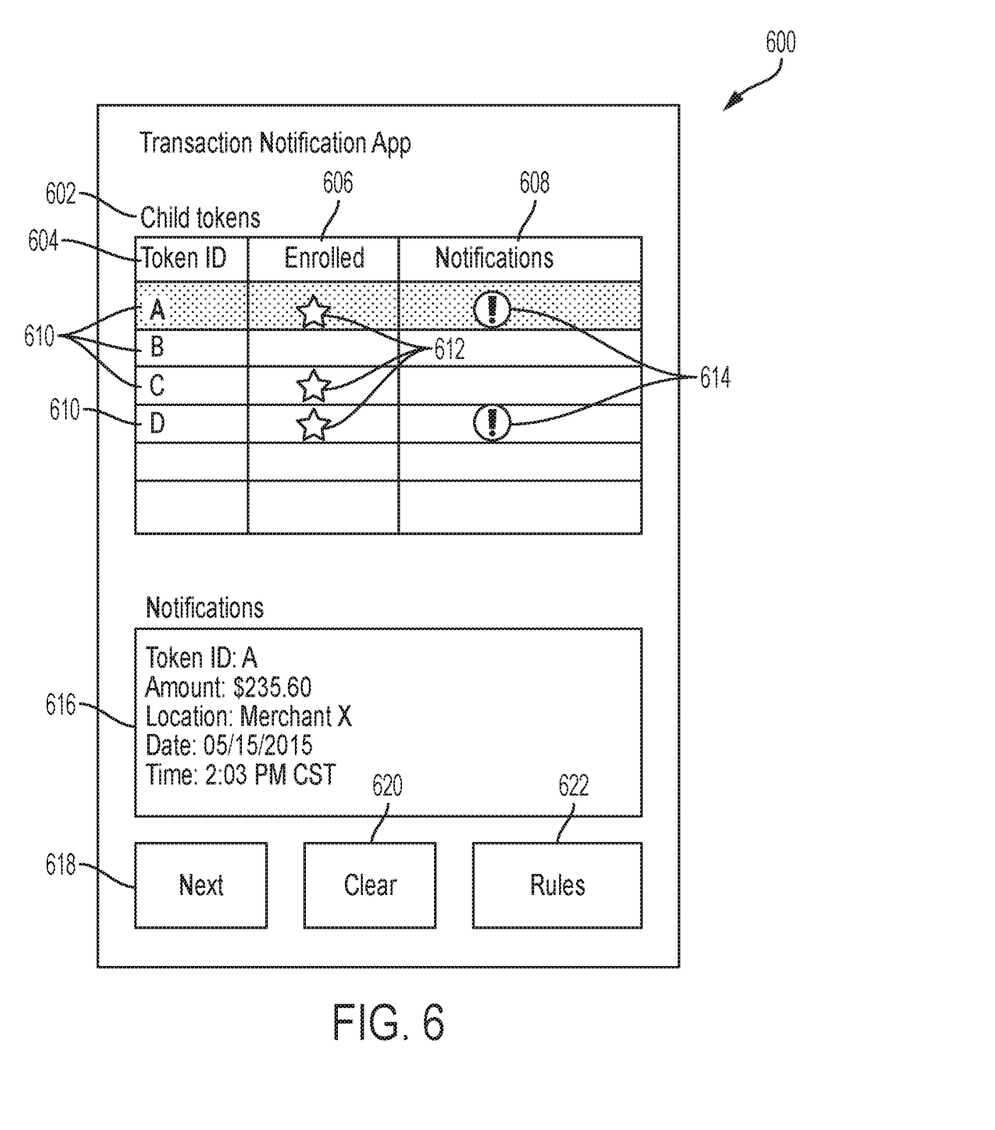
FIG. 6 is an exemplary application interface that may be used, in connection with the system of FIG. 1 and/or the methods of FIGS. 3-5, for receiving notifications for transactions to a group payment account and/or enrolling members associated with parent tokens for the group payment account to receive notifications related to one or more child tokens.

FIG. 6 is an exemplary application interface 600 for a transaction notification application that may be used in conjunction with the system of FIG. 1 and/or any of the methods 300, 400, 500. For instance, consumer 112a may have the application installed on the communication device 114a. The interface 600 displays information associated with child tokens of a parent token, for example, information associated with token B of token A in the system 100, and transactions associated with the child tokens. On the interface 600, there is a child tokens section 602 that displays information about each child token of the parent token. The section 602 includes a table with rows for each child token 610, a "token ID" column 604, an "enrolled" column 606, and a "notifications" column 608. The token ID column 604 contains token identifiers for each child token 610 in the child token rows. FIG. 6 displays the token identifiers as letters, but it should be understood that the identifiers in other embodiments may be represented differently (e.g., by an identifying number, a name, a combination of letters and numbers, symbols, images, etc.).

The enrolled column 606 provides an indicator 612 that is displayed when the parent token is enrolled to receive transaction notifications for the child tokens 610 of the child token row. While FIG. 6 portrays the indicators 612 as stars, they may be represented differently in other embodiments (e.g., as checkmarks, a "Yes" or a "No", other symbols, highlighting, etc.). In some embodiments, a member (e.g., consumer 112a, etc.) may interact with the enrolled column in order to enroll or un-enroll to notifications for a child token. For instance, if the interface 600 is displayed on a touch screen presentation unit 206, the member may touch one of the indicators 612 to un-enroll from notifications for child tokens A, C, or D. Alternatively, the member may touch the enrolled column for child token C to enroll in notifications for child token B.

The notifications column 608 displays an icon 614 when a child token has a current, recent, and/or unread notification. As illustrated, the icons 614 are represented by a circle with an exclamation point, but, like the star indicators 612, the icons 614 may be represented differently in other embodiments (e.g., a word or words indicating something about the notification, a number indicating a number of notifications, a different symbol and/or word, multiple icons for multiple notifications, etc.). The member may further interact with an icon 614 to access the notification for that child token. For example, in embodiments where the interface 600 is displayed on a touch screen presentation unit 206, the member may touch the icon to cause the interface 600 to display notification information in notifications section 616.

Additionally or alternatively, a communication device (e.g., communication device 114a or 114b, etc.) on which a notification application (e.g., an application associated with the exemplary interface 600, etc.) is active may also notify the user of the communication device via a direct notification on the communication device (e.g., a "push" notification, etc.), which may appear simply as a message, a ding, or similar visual and/or audio notification on the communication device, which may include transaction details or not.

With continued reference to FIG. 6, the notifications section 616 displays details about a transaction that triggers a notification (e.g., the notification for child token A in the child tokens section 602, etc.). The notifications section 616 may display the transaction details in text, as shown, and/or the section may be interactive (e.g., a member may interact with the location field to see the location on a map, a member may interact with the amount field to get a breakdown of items purchased, etc.). While the notifications section 616 is shown as displaying a token ID, an amount, a location, a date, and a time, it should be understood that more, different, or fewer details may be provided in other embodiments. The notifications section 616 may be linked to the child tokens section 602 such that the content of the notification section 616 is updated based on selections made in the child tokens section 602. For instance, in FIG. 6, the row associated with child token A is shown as being highlighted, and, as a result, the notification for child token A is shown in the notifications section 616. A member may then interact with the row for child token D and cause the transaction notification for child token D to be displayed in the notifications section 616.

The interface 600 also includes a "Next" button 618. A member may interact with the next button 618 to cause the notifications section 616 to display the transaction details of the next notification. For instance, the member (e.g., the consumer 112a, etc.) may interact with the next button 618 and the transaction details of the notification of child token D may replace the details of the notification of child token A. Alternatively, the notifications section 616 may append the next details below the currently displayed details, forming a list of transaction details. A scroll bar may be displayed, enabling the member to scroll between multiple transaction notifications.

The interface 600 also includes a "Clear" button 620. The clear button 620 may clear the current transaction details of the notifications section 616 when the member (e.g., the consumer 112a, etc.) is finished with them. Additionally or alternatively, the clear button 620 may cause the notification icon 614 in the child tokens section 602 to disappear, signaling to the member that there are no more notifications for the child token that need to be viewed. In other embodiments, a clear button 620 may clear all of the current notifications from the child token section 602 and/or the notifications section 616.

The interface 600 further includes a "Rules" button 622 that may enable the member (e.g., the consumer 112a, etc.) to access the notification rules for one or more child tokens 610. As described above, the member may establish rules that customize how and when the member receives notifications. The rules button 622 may, for example, enable the member to set or change his/her preferred method of notification delivery. Further, the rules button 622 may enable the member to establish additional limitations regarding desired notifications (e.g., the member may desire notifications only if the transaction exceeds $20.00, or only if the transaction occurs outside the city limits, etc.). The rules button 622 may take the member to a separate interface (not shown) for creating and/or altering notification rules. In some embodiments, the rules button 622 may only enable access to rules associated with the highlighted child token (e.g., child token A, etc.). Alternatively, the rules button 622 may enable the member to access preferences for all of the child tokens of the parent token.

It should be understood that, in other embodiments, an application interface may include more, fewer, or different features from those described above. For instance, in some embodiments, an application interface may enable a user to request a transaction details report, as described in FIG. 5. In other embodiments, the member may be enabled by the interface to contact the member to whom the child tokens are issued in response to received notifications, or to take other actions in response to notifications (e.g., limiting the use of the child token, temporarily deactivating the child token, etc.).

Further, it should be understood that the application associated with the interface 600, for example, may provide the member additional modes of notifications, such as "push" notifications, audio notifications, vibration, email message, SMS message, and/or voicemail message, etc.

In view of the above, the systems and methods herein may permit identification of transactions associated with tokens of a payment account and distribution of notifications to members associated with the tokens. In particular, the member associated with a parent token for the payment account may enroll to receive notifications associated with subordinate tokens, or child tokens, of the payment account. The provision of notifications to that member of the payment account provides visibility of transactions associated with the child tokens and/or parent tokens of the payment account in order to more closely track usage of the account.

Again and as previously described, it should be appreciated that the functions described herein, in some embodiments, may be described in computer executable instructions stored on a computer readable media, and executable by one or more processors. The computer readable media is a non-transitory computer readable storage media. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) identifying transaction data for a transaction associated with a child token; (b) identifying, in a data structure, a parent token with which the child token is associated, where the parent token is enrolled to receive a notification for the transaction associated with the child token; (c) transmitting a notification to a communication device of a group member associated with the parent token in response to the transaction involving the child token, where the notification includes transaction data associated with the transaction such that the transaction is thereby identified to the group member along with the associated transaction data; (d) enrolling the child token to receive a notification for the transaction associated with the child token, and transmitting a notification to a communication device associated with the child token in response to the transaction; (e) compiling the notification based on at least one notification rule of the parent token, the at least one notification rule indicating a content of the notification and/or a method of delivery of the notification; (f) receiving a request for a report notification from the group member, where the request includes a defined interval, and compiling the notification as a report notification based on the defined interval.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

As used herein, a token (e.g., a payment token, etc.) generally is an electronic data set that includes credentials that may be used in a purchase transaction in place of traditional payment credentials. Typically, the credentials for the token are uniquely associated to a computing device (e.g., a portable communication device, etc.), for example, to which the token is provisioned. Because the token is directly associated to the computing device, theft of the token may be inconsequential to the user, since the token is unusable if not used in conjunction with the proper computing device. Thus, the use of the token can enable electronic payment transactions involving the computing device with greater security without a sacrifice to efficiency or convenience. The systems and methods herein thus may also include, as appropriate, generating and/or assigning the tokens to consumers and provisioning the tokens to computing devices associated with the consumers.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for distributing notifications among tokens, the system comprising:

at least one memory device including a token data structure, the token data structure including: a parent token specific to a single payment account issued to a parent user, a child token specific to said single payment account, an association between the parent token and the child token, and at least one notification rule associated with the parent token and defined by the parent user, the at least one notification rule indicating a content of a notification, wherein the parent token is a data set, wherein the child token is a data set that is unique to an identifier specific to a communication device of a child user, and wherein the parent token and the child token are each different from a primary account number (PAN) for the single payment account; and a processor in communication with the at least one memory device, the processor configured to:
identify a transaction to said single payment account initiated with the child token, based on an authorization message for the transaction including the child token;
identify, in the token data structure, the parent token associated with the child token based on the association between the parent token and the child token;
identify a communication device of the parent user associated with the parent token, based on a payment device identifier included in the token data structure and associated with the parent token, wherein the communication device of the parent user includes an application and wherein the payment device identifier includes an application ID specific to said application; and
transmit the notification, as a push notification, to the identified communication device of the parent user, via said application, based on the application ID, when the parent token is enrolled to receive notifications for transactions initiated by the child token and the at least one notification rule associated with the parent token in the token data structure is satisfied, the notification including a location of the transaction, whereby the communication device of the parent user renders the location to the parent user on a visual map at the communication device of the parent user.

2. The system of claim 1, wherein the notification includes a transaction notification; and
wherein the processor is configured to transmit the notification as a push notification in near real time.

3. The system of claim 1, wherein the at least one notification rule defines the content of the notification to include a designation associated with the child token, an amount of said transaction, and a name of a merchant involved in said transaction.

4. The system of claim 3, wherein the at least one notification rule further defines a transaction amount threshold; and
wherein the processor is configured to transmit the notification to the communication device of the parent user only when the amount of said transaction exceeds the transaction amount threshold, whereby the at least one notification rule is satisfied.

5. The system of claim 4, wherein the at least one notification rule further defines a merchant category criteria for said transaction; and
wherein the processor is configured to transmit the notification to the communication device of the parent user only when said transaction involves a merchant that satisfies the merchant category criteria.

6. The system of claim 1, wherein the processor is further configured to:
access transaction data for a defined interval, for the single payment account, in response to a report notification request from the parent user associated with the parent token; and
transmit a report notification to the communication device of the parent user of the parent user.

7. The system of claim 6, wherein the processor is further configured to:
receive a notification enrollment message including an identifier associated with the child token and an identifier associated with the parent token; and
update notification enrollment data for the parent token to receive notifications associated with the transactions of the child token.

* * * * *